United States Patent
Nowicki et al.

(10) Patent No.: US 10,643,379 B2
(45) Date of Patent: May 5, 2020

(54) SYSTEMS AND METHODS FOR FACILITATING IMAGERY AND POINT-CLOUD BASED FACILITY MODELING AND REMOTE CHANGE DETECTION

(71) Applicant: Quantum Spatial, Inc., St. Petersburg, FL (US)

(72) Inventors: Scott Nowicki, Portland, OR (US); David Brandt, Portland, OR (US); Richard Armstrong, Portland, OR (US); Seth Hill, Portland, OR (US)

(73) Assignee: Quantum Spatial, Inc., St. Petersburg, FL (US)

(*) Notice: Subject to any disclaimer, the term of this patent is extended or adjusted under 35 U.S.C. 154(b) by 1 day.

(21) Appl. No.: 16/045,636

(22) Filed: Jul. 25, 2018

(65) Prior Publication Data

US 2019/0035146 A1    Jan. 31, 2019

Related U.S. Application Data

(60) Provisional application No. 62/539,179, filed on Jul. 31, 2017.

(51) Int. Cl.
*G06T 17/05*     (2011.01)
*G06T 17/20*     (2006.01)
(Continued)

(52) U.S. Cl.
CPC ............. *G06T 17/05* (2013.01); *G01J 5/601* (2013.01); *G01S 7/4808* (2013.01); *G01S 17/89* (2013.01);
(Continued)

(58) Field of Classification Search
None
See application file for complete search history.

(56) References Cited

U.S. PATENT DOCUMENTS 6,246,468 B1 *  6/2001  Dimsdale ............. G01B 11/002
                                                  356/4.02
7,639,842 B2 * 12/2009  Kelle .................... G01C 11/00
                                                  382/109

(Continued)

FOREIGN PATENT DOCUMENTS

CN     102280826 A    12/2011
CN     202178515 U     3/2012

OTHER PUBLICATIONS

Randall B. Smith, "Introduction to Remote Sensing of Environment (RSE)", 2012, MicroImages (Year: 2012).*

*Primary Examiner* — YuJang Tswei
(74) *Attorney, Agent, or Firm* — FisherBroyles, LLP

(57) ABSTRACT

Various embodiments are directed to facilitating imagery and point-cloud based facility modeling and remote change detection. A computing device may receive collected data for a facility. The collected data may include spatial image data obtained from light detection imaging and ranging systems (LiDAR), multispectral data, and thermal data. The computing device may then analyze, based on software models generated for previously collected data for the facility, the collected data to determine changes in the previously collected data. The computing device may then update the models upon determining changes in the previously collected data. Finally, the computing device may generate an alert based on the updated models when any changes in the previously collected data are above a predetermined threshold corresponding to a current security or operational condition associated with the facility.

12 Claims, 3 Drawing Sheets

(51) Int. Cl.
    *G01S 17/89*     (2020.01)
    *G01J 5/60*     (2006.01)
    *G06T 19/00*     (2011.01)
    *G01S 7/48*     (2006.01)

(52) U.S. Cl.
    CPC .............. *G06T 17/20* (2013.01); *G06T 19/00* (2013.01); *G06T 2207/10024* (2013.01); *G06T 2207/10028* (2013.01); *G06T 2207/10036* (2013.01); *G06T 2210/56* (2013.01)

(56) References Cited

U.S. PATENT DOCUMENTS

| | | | |
|---|---|---|---|
| 9,536,313 B2 * | 1/2017 | Dow | G01B 11/24 |
| 2010/0152910 A1 | 6/2010 | Taft | |
| 2014/0376821 A1 * | 12/2014 | Meir | G01S 17/50 |
| | | | 382/218 |
| 2017/0189614 A1 * | 7/2017 | Mazlish | A61M 5/1407 |

\* cited by examiner

SYSTEMS AND METHODS FOR FACILITATING IMAGERY AND POINT-CLOUD BASED FACILITY MODELING AND REMOTE CHANGE DETECTION

CROSS-REFERENCE TO RELATED APPLICATIONS

This patent application claims priority to U.S. Patent Application Ser. No. 62/539,179, filed Jul. 31, 2017 and entitled "Systems and Methods for Facilitating Imagery and Point-Cloud Based Facility Modeling and Remote Change Detection," of which the disclosure is incorporated herein, in its entirety, by reference.

TECHNICAL FIELD

Embodiments of the disclosure relate generally to facility/equipment inspection and more specifically to facilitating imagery and point-cloud based facility modeling and remote change detection.

BACKGROUND

Electrical substations, water utility facilities, and transportation corridors all serve as essential links in the nation's infrastructure networks. Failure of individual components in a facility, which may be caused by natural corrosion over time, defects, event-induced equipment breakage and/or equipment overloading, can cause major disruption to operations, loss of revenue, and significant replacement costs. Traditional methods for preventing component failure in facilities include periodic (e.g., monthly) on-site inspection and maintenance programs that require an inspector to visit each facility, perform a manual inspection, and document identified hazards. Some of these methods may optionally or additionally further include automated inspection platforms utilizing robotic operations and/or virtualized visual inspection routines, as well as asset management systems. However, traditional facility inspection methods also suffer from a number of drawbacks. For example, in current manual or automated facility inspection methods, the recognition of changes in the status of various facility equipment or structural components is strictly based upon the data types collected for system monitoring. Furthermore, these traditional facility inspection methods do not allow for the timely monitoring of multiple kinds of changes across multiple elements using a single set of observations. Moreover, traditional facility inspection methods fail to detect both spatial and spectral (e.g., color) changes. As a result, traditional facility inspection methods may often fail to accurately evaluate the conditions of individual elements leading to missed equipment failures or maintenance issues that may need to be addressed. It is with respect to these considerations and others that the various embodiments of the present invention have been made.

SUMMARY

As will be described in greater detail below, the instant disclosure describes various systems and methods for facilitating imagery and point-cloud based facility modeling and remote change detection.

In one example, a system for facilitating imagery and point-cloud based facility modeling and remote change detection include at least one processor and a memory storing computer-executable instructions that when executed by the at least one processor, cause the system to (1) receive, by a computing device, collected data for a facility, (2) analyze, by the computing device, based on one or more models generated for previously collected data for the facility, the collected data to determine at least one change in the previously collected data, (3) update, by the computing device, the models upon determining the at least one change in the previously collected data, and (4) generate, by the computing device, an alert based on the updated models when the at least one change in the previously collected data is above a predetermined threshold corresponding to a current security or operational condition associated with the facility.

In some examples, the models may be generated by (1) receiving spatial image data in the previously collected data, the spatial image data describing elements associated with a physical structure of the facility, (2) generating, from the spatial image data, a first three-dimensional model identifying and coding each of the elements, and (3) assigning a first base-level buffer to each of the elements, the first base-level buffer representing a variability threshold with respect to dimensions and characteristics associated with each of the elements. In some examples, the models may be further generated by (1) receiving multispectral and thermal image data in the previously collected data, the multispectral and thermal image data describing a color, spectral reflectance, and temperature range for each of the elements from one or more multispectral and thermal cameras, (2) generating, from the multispectral and thermal image data, a second three-dimensional model identifying and coding each of the elements, and (3) assigning a second base-level buffer to each of the elements, the second-base level buffer representing a variability threshold with respect to the color, spectral reflectance, and temperature range for each of the elements.

In some examples, the elements associated with the physical structure of the facility may include fixed and dynamic objects within the facility and/or fixed and dynamic objects in a proximity to the facility. In some examples, the collected data may analyzed by (1) comparing the first and second three-dimensional models to new spatial image, multispectral, and thermal image data in the collected data and (2) determining a change in each element based on the comparison.

In some examples, the alert may be generated by (1) determining that the at least one change in the previously collected data exceeds the variability threshold represented by the first or second base-level buffers for at least one of the elements and (2) generating the alert for each element exceeding the threshold. In one example, the spatial image data may include image-derived point cloud data generated by one or more autonomous vehicles in proximity to the facility. In this example, the autonomous vehicles may include ground and/or airborne light imaging direction and ranging (LiDAR) systems.

In some examples, the spatial image data comprises image data may be generated by one or more fixed sensors associated with the facility. In some examples, the facility may include a public utility substation.

In one embodiment, a method for facilitating imagery and point-cloud based facility modeling and remote change detection may include (1) receiving, by a computing device, collected data for a facility, (2) analyzing, by the computing device, based on one or more models generated for previously collected data for the facility, the collected data to determine at least one change in the previously collected data, (3) updating, by the computing device, the models upon determining the at least one change in the previously collected data, and (4) generating, by the computing device, an alert based on the updated models when the at least one change in the previously collected data is above a predetermined threshold corresponding to a current security or operational condition associated with the facility.

In some examples, the models may be generated by (1) receiving spatial image data in the previously collected data, the spatial image data describing elements associated with a physical structure of the facility, (2) generating, from the spatial image data, a first three-dimensional model identifying and coding each of the elements, and (3) assigning a first base-level buffer to each of the elements, the first base-level buffer representing a variability threshold with respect to dimensions and characteristics associated with each of the elements. In some examples, the models may be further generated by (1) receiving multispectral and thermal image data in the previously collected data, the multispectral and thermal image data describing a color, spectral reflectance, and temperature range for each of the elements from one or more multispectral and thermal cameras, (2) generating, from the multispectral and thermal image data, a second three-dimensional model identifying and coding each of the elements, and (3) assigning a second base-level buffer to each of the elements, the second-base level buffer representing a variability threshold with respect to the color, spectral reflectance, and temperature range for each of the elements.

In some examples, the elements associated with the physical structure of the facility may include fixed and dynamic objects within the facility and/or fixed and dynamic objects in a proximity to the facility. In some examples, the collected data may be analyzed by (1) comparing the first and second three-dimensional models to new spatial image, multispectral, and thermal image data in the collected data and (2) determining a change in each element based on the comparison.

In some examples, the alert may be generated by (1) determining that the at least one change in the previously collected data exceeds the variability threshold represented by the first or second base-level buffers for at least one of the elements and (2) generating the alert for each element exceeding the threshold. In one example, the spatial image data may include image-derived point cloud data generated by one or more autonomous vehicles in proximity to the facility. In this example, the autonomous vehicles may include ground and/or airborne light imaging direction and ranging (LiDAR) systems.

In some examples, the spatial image data comprises image data may be generated by one or more fixed sensors associated with the facility. In some examples, the facility may include a public utility substation.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, by the computing device, collected data for a facility, (2) analyze, by the computing device, based on one or more models generated for previously collected data for the facility, the collected data to determine at least one change in the previously collected data, (3) update, by the computing device, the models upon determining the at least one change in the previously collected data, and (4) generate, by the computing device, an alert based on the updated models when the at least one change in the previously collected data is above a predetermined threshold corresponding to a current security or operational condition associated with the facility.

In some examples, the models may be generated by (1) receiving spatial image data in the previously collected data, the spatial image data describing elements associated with a physical structure of the facility, (2) generating, from the spatial image data, a first three-dimensional model identifying and coding each of the elements, and (3) assigning a first base-level buffer to each of the elements, the first base-level buffer representing a variability threshold with respect to dimensions and characteristics associated with each of the elements. In some examples, the models may be further generated by (1) receiving multispectral and thermal image data in the previously collected data, the multispectral and thermal image data describing a color, spectral reflectance, and temperature range for each of the elements from one or more multispectral and thermal cameras, (2) generating, from the multispectral and thermal image data, a second three-dimensional model identifying and coding each of the elements, and (3) assigning a second base-level buffer to each of the elements, the second-base level buffer representing a variability threshold with respect to the color, spectral reflectance, and temperature range for each of the elements.

In some examples, the elements associated with the physical structure of the facility may include fixed and dynamic objects within the facility and/or fixed and dynamic objects in a proximity to the facility. In some examples, the collected data may analyzed by (1) comparing the first and second three-dimensional models to new spatial image, multispectral, and thermal image data in the collected data and (2) determining a change in each element based on the comparison.

In some examples, the alert may be generated by (1) determining that the at least one change in the previously collected data exceeds the variability threshold represented by the first or second base-level buffers for at least one of the elements and (2) generating the alert for each element exceeding the threshold. In one example, the spatial image data may include image-derived point cloud data generated by one or more autonomous vehicles in proximity to the facility. In this example, the autonomous vehicles may include ground and/or airborne light imaging direction and ranging (LiDAR) systems.

In some examples, the spatial image data comprises image data may be generated by one or more fixed sensors associated with the facility. In some examples, the facility may include a public utility substation.

BRIEF DESCRIPTION OF THE FIGURES

The accompanying drawings illustrate a number of example embodiments and are a part of the specification. Together with the following description, these drawings demonstrate and explain various principles of the instant disclosure.

DETAILED DESCRIPTION OF EXAMPLE EMBODIMENTS

Figure 1:
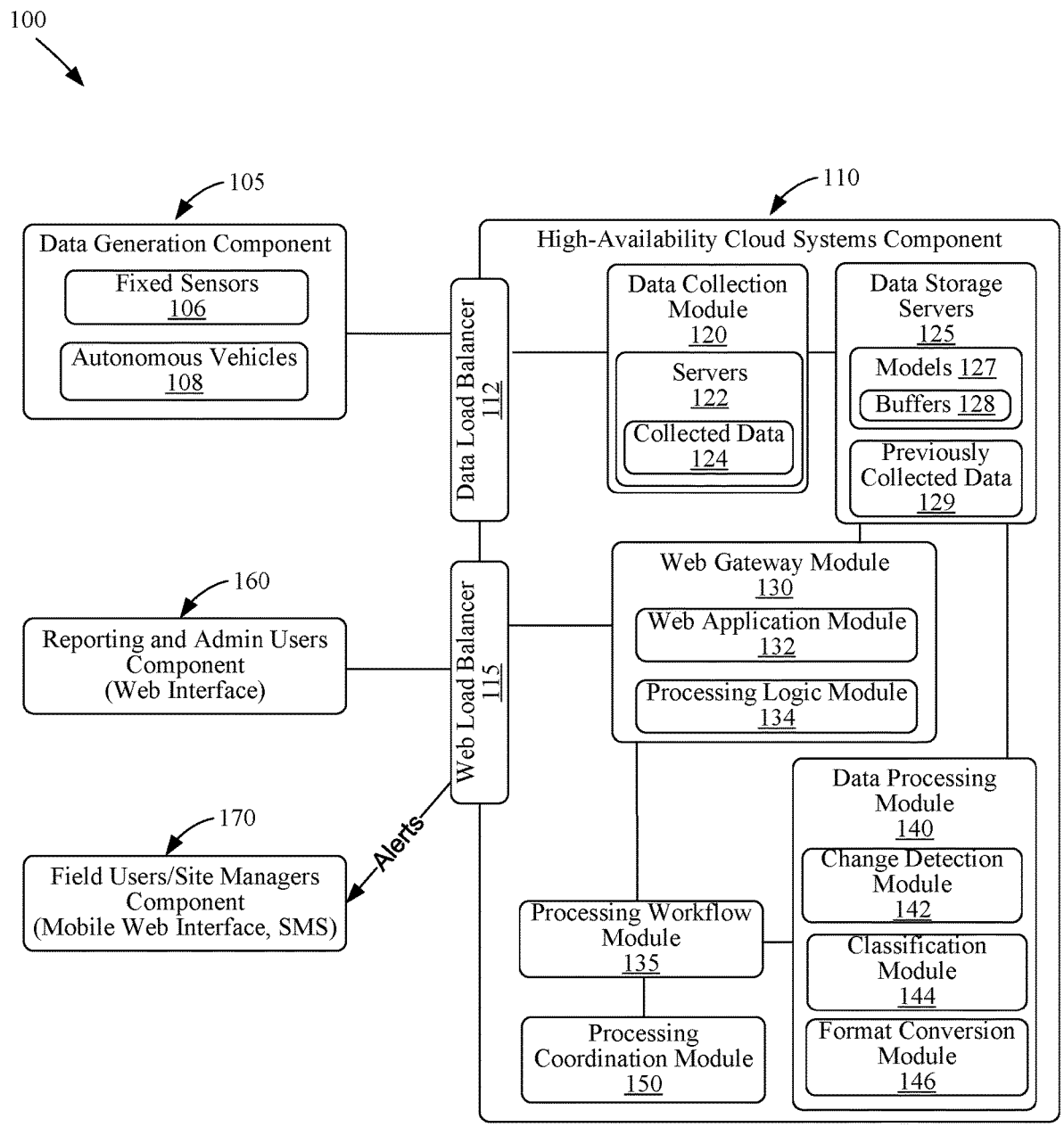
FIG. 1 illustrates a block diagram of an example system for facilitating imagery and point-cloud based facility modeling and remote change detection, according to an example embodiment.

Various embodiments of the disclosure are directed to systems and methods for facilitating imagery and point-cloud based facility modeling and remote change detection. In some embodiments, a suite of sensors and data collection procedures are utilized to generate a series of structural and spectral models representing various components (e.g., structural and equipment components) in a facility such as an electrical substation and/or a water utility. The models may be monitored for change and failure with respect to facility operations and/or maintenance. The models may be generated and maintained using robotic, unmanned aircraft systems (UAS), and/or human-based data collection systems.

In some embodiments, systems and methods may be provided that specify a fully automated data collection for, and generation of, a multi-faceted (e.g., multidimensional) model of a substation using a number of elements such as calibrated georeferenced multispectral imagery, thermal infrared image-derived temperature, and/or structural point-clouds. The aforementioned elements may be incorporated into multidimensional physical models in order to independently detect the occurrence of changes in coloration (e.g., discoloration), size, shape, position, and/or temperature of substation components and further use those detections to model the type and degree of change autonomously. The systems and methods may further allow for detection algorithms to identify change in more than one dimension (e.g., spatial, spectral, and/or temporal) and use the relationships of those detections to identify a type of change for a given component in a substation (e.g., movement of a switch versus rusting of a stationary switch).

In some embodiments, a change detection and monitoring system may include a multi-layered data collection and model generation scheme that can be autonomously updated using airborne, robotic, and/or manual data collection platforms. In some embodiments, data may be collected for an initial mapping in which each of one or more substations is scanned using a point-cloud generating system (e.g., a high precision ground and/or airborne Light Detection and Ranging (LiDAR) systems and/or images for an image-derived point cloud). In some embodiments, the data collection may also include data representing a full-suite three-dimensional (3D) image mosaic using imagery that may be collected with visible and near-infrared multispectral and thermal infrared cameras. In some embodiments, the data collected may only be visible imagery and point cloud data. In other embodiments, the data collected may only be thermal and multispectral data. In yet other embodiments, the data collected may be both visible imagery and point cloud data as well as thermal and multispectral data.

This initial mapping may provide the physical structure of all elements of a substation including ground, perimeter fencing, and all other structures within a substation perimeter or yard. A preliminary 3D model may then be determined that identifies and codes all elements (e.g., fixed objects and/or dynamic features) within the substation and establish a base-level buffer that may be assigned to each element. In some embodiments, the preliminary 3D model may optionally or additionally assign and include in the base-level buffer additional features associated with each element such as color, spectral reflectance, and/or temperature range that may represent an expected degree of variability that does not constitute change (e.g., sunlit/shaded, wet/dry, changing illumination conditions, etc.).

The buffer may represent a normal variability in physical dimensions and/or characteristics (e.g., color, spectral reflectance, and/or temperature range) associated with an element that does not constitute change. These buffers may be utilized to distinguish physical changes due to movement, deformation, and/or size as well as feature changes due to changes in color, spectral reflectance, and/or temperature range. The initial assignment of buffer dimensions and characteristics may be a function of a particular element and its relationships to other features in proximity. The initial models, which may include spatial and/or spectral models of a facility (e.g., a substation), may then be used to determine a current state and level of corrosion or deformation from an original element based on available data. Moreover, the initial models be used for comparison to new datasets that may further be collected in order to detect change over time.

In some embodiments, subsequent data collection (e.g., subsequent facility scans) of elements may be initiated. The subsequent or new data may be compared with the initial models and the most recent previous dataset. During this phase, the initial models may be applied to newly collected data and the buffers and conditions for each element may be refined. As new data is input into a model, the model may automatically test the previous point cloud and imagery data for change and further reduce the new data to a geodatabase of detections assigned to individual elements or hotspots in open space. Balancing between point cloud (e.g., physical) and imagery (e.g., spectral) changes may be different for different elements. Thus, in some embodiments, a redundant check on change detection or a method by which changes can be automatically classified may be performed. Any detection that represents a significant amount of change for particular elements may generate an alert (e.g., an external electronic signal sent to human operators to validate the detection of a significant change and to perform a subsequent corrective action). In some embodiments, alerts may be initially ranked and coded as a function of an element, degree of change, and/or condition (if identified). Elements may also be ranked based on severity (e.g., a fence, transformer, lightning arrestor, etc.) and any change detected on high-severity elements may be pushed to a high alert status. In some embodiments, other changes may be detected that may also be high severity changes but which are associated with an element, such as an intruder detected within a facility perimeter. In this scenario, any large degree of change may be treated a high priority. In some embodiments, until a series of high priority changes have been assessed, uninterpretable changes may need to be immediately verified by an operator. For dynamic elements (e.g., doors, switches, etc.) a condition status may be sent to a monitoring model that may be accessed by an operator, and in which each element's most recent condition and history may be accessed. In this manner, a quick review of a substation monitoring model by a human operator can reveal the most recent status of each element and the last time a change was observed.

In some embodiments, where a significant change has been determined to have occurred, the model may be updated with specific change conditions, and in cases where a significant change did not occur, an operator may refine the buffer or log the condition that caused the false positive. This iterative methodology may train the model using real world conditions and build a context for each element change. In some embodiments, and for some elements, changes that represent a "normal" interpretable change (e.g., a door open/closed, or shaded/illuminated) may be included in the model buffers. Over time, the model refinement for each facility may require less and less operator input with more accurate results.

The embodiments of the disclosure described herein provide several advantages over traditional methods. Advantages include the ability to detect both spatial and spectral (color) changes and compare those changes to each other in order to better evaluate the conditions of individual elements.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

System Overview

FIG. 1 illustrates a block diagram of an example system 100 for facilitating imagery and point-cloud based facility modeling and remote change detection. The system 100 may include a number of components including data generation component 105, high-availability cloud systems component 110, reporting and administrative users component 160, and field users/site managers component 170. In some embodiments, each of the aforementioned components may include one or more server and/or client computing devices or modules for carrying out various tasks associated with facilitating imagery and point-cloud based facility modeling and remote change detection.

In some embodiments, the data generation component 105 may include a number of sensors and autonomous vehicles within a facility substation, such as fixed sensors 106 and autonomous vehicles 108, for collecting data describing structural features and/or equipment associated with the substation. The fixed sensors 106 may include, but are not limited to, thermal and multispectral sensors such as visible and near-infrared multispectral and thermal infrared cameras. The autonomous vehicles 108 may include, but are not limited to, autonomous robots and high precision ground and/or airborne LiDAR systems for collecting images (such as image-derived point clouds) as well as thermal and/or multispectral temperature data using visible and near-infrared multispectral and thermal infrared cameras attached thereto. Thus, the data generated by the fixed sensors 106 and the autonomous vehicles 108 may include spatial, spectral, and/or temporal data associated with various elements in or in proximity to a facility. The generated data may then be sent to the high-availability cloud systems component 110.

The high-availability cloud systems component 110 may include data collection module 120 including one or more servers 122. In some embodiments, the servers 122 may receive the data generated by the data generation component 105 (i.e., collected data 124) on a daily basis according to a predetermined schedule. When a very large amount of data needs to be collected, data load balancer 112 may be utilized by the data collection module 120 to regulate the collection of data by the servers 122. For example, the data load balancer 112 may transmit the collected data 124 in parts over an extended time period so as to not overload processing, memory, and/or bandwidth resources of the servers 122. Alternatively, the data load balancer 112 may split the data to be collected into individual data streams for communicating to each of the servers 122 such that no one server 122 is overloaded with data.

The data storage servers 125 may receive the collected data 124 from the servers 122 in the data collection module 120 for both short term and long term storage in models 127. The collected data 124 may then be retrieved from the data storage servers 125 by web gateway module 130 and data processing module 140.

The web gateway module 130 may include web application module 132 and processing logic module 134. In some embodiments, the web application module 132 and the processing logic module 134 may be utilized by reporting and administrative users component 160 (via a web interface) to generate and update spatial, multispectral and thermal models (e.g., the models 127) representing various components (e.g., structural and equipment components) in a facility. For example, the web gateway module 130 may be utilized by the reporting and administrative users component 160 to generate an initial model in the models 127 from initially collected data for a facility received from the data storage servers 125. In some embodiments, web load balancer 115 may be utilized to regulate the data flow from the reporting and administrative users component 160 such that the web gateway module 130 is not overloaded.

The data processing module 140 may include change detection module 142, classification module 144, and format conversion module 146. In some embodiments, the change detection module 142 may be utilized to analyze the collected data 124 received from the data storage servers 125 and determining changes from previously collected data 129. For example, the change detection module 142 may determine that a facility door which was closed in a previously received image is now open. The classification module 144 may be utilized to classify any changes determined by the change detection module 142 according to severity. For example, if the change detection module 142 determines from newly collected multispectral data that a previously working transformer in a substation is showing signs of rust (which may be indicative of a leak or other serious problem), the classification module 144 may classify this data as high severity. In some embodiments, the format conversion module 146 may be utilized to convert the change detection data and/or the classification data into a format compatible with the models 127 generated, maintained, and updated the web gateway module 130. In some embodiments, the change detection data and the classification data may be sent to processing workflow module 135 and processing coordination module 150, prior to being sent to the web gateway module 130. The web gateway module 130, upon receiving the formatted change detection and classification data from the data processing module 140, may update a current model 127 (as well as any buffers 128 associated with the model 127) and interpret the classification data for any issues requiring an alert which may be communicated to the field users/site managers component 170 via a mobile web interface or as a short message service (SMS) message. In some embodiments, the interpretation of the classification data may be made by personnel in the reporting and administrative users component 160. For example, upon receiving change detection data indicating a rusty transformer, an alert may be generated (either automatically or after receiving input from the reporting and administrative users component 160) that a facility has a potential faulty transformer.

In certain embodiments, one or more of the modules described above in FIG. 1 may represent one or more software applications or programs that, when executed by a computing device, may cause the computing device to perform one or more tasks. For example, and as will be described in greater detail below, one or more of the above-described modules may represent software modules stored and configured to run on one or more computing devices, such as the devices illustrated in FIG. 2 (e.g., server computing device(s) 205 and/or client computing device(s) 210. One or more of the modules in FIG. 1 may also represent all or portions of one or more special-purpose computers configured to perform one or more tasks.

Figure 2:
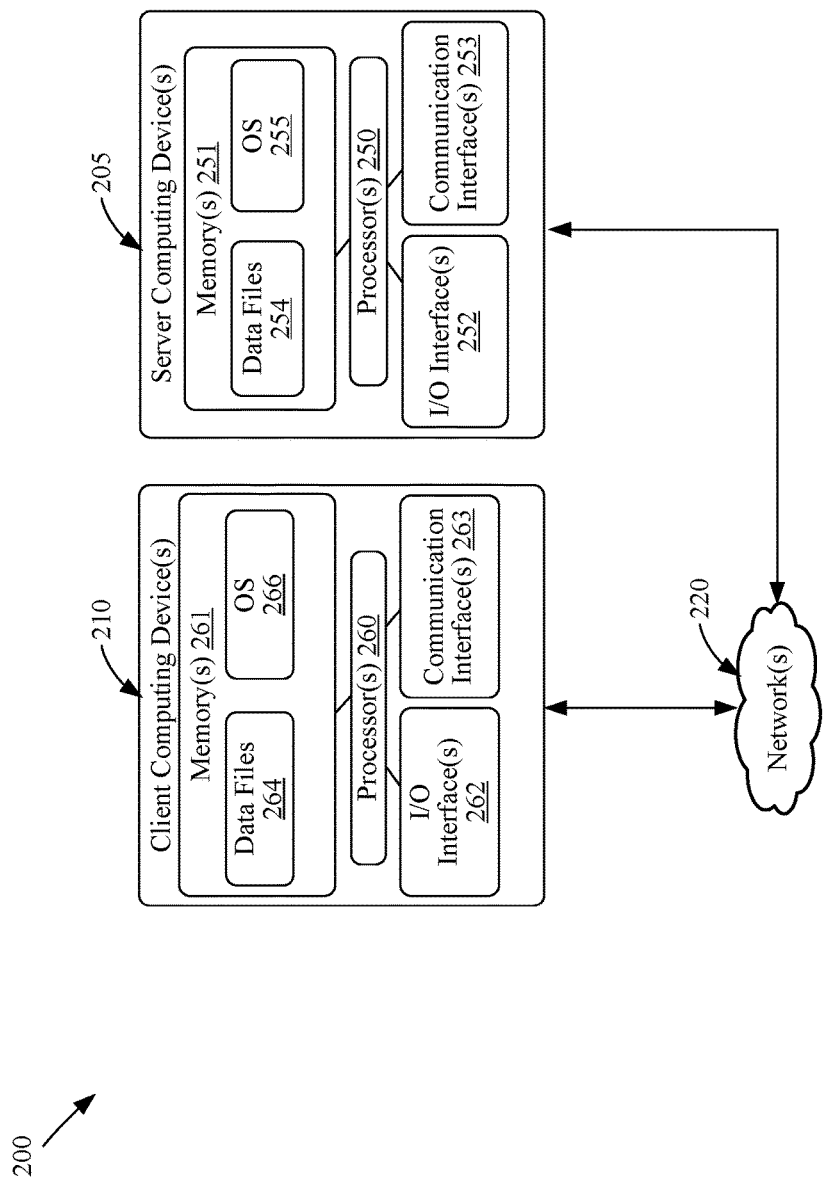
FIG. 2 illustrates a block diagram of a networked computing environment for facilitating imagery and point-cloud based facility modeling and remote change detection, according to an example embodiment.

FIG. 2 illustrates a block diagram of a networked computing environment 200 for facilitating imagery and point-cloud based facility modeling and remote change detection, according to an example embodiment. With reference to FIG. 2, the networked computing environment 200 may include one or more server computing devices 205 and one or more client computing devices 210 in communication over network 220.

In some embodiments, the server computing device 205 may include the various modules and servers in the high-availability cloud systems component 110 described with respect to FIG. 1. For example, the server computing devices 205 may include the data collection module 120 (including the servers 122), the data storage servers 125, the web gateway module 130, the data processing module 140, the processing workflow module 135, and/or the processing coordination module 150.

As desired, the server computing device 205 may include any number of processor-driven devices or systems, including but not limited to, cloud-based or dedicated application servers, a mobile computer, an application-specific circuit, a minicomputer, a microcontroller and/or any other processor-driven devices or systems configured to run certain software applications for receiving and processing large amounts of data. The server computing device 205 may utilize one or more processors 250 to execute computer-readable instructions that facilitate the general operation of the server computing device 205 and facilitating imagery and point-cloud based facility modeling and remote change detection.

In addition to having one or more processors 250, the server computing device 205 may further include and/or be associated with one or more memory devices 251 (hereinafter "memory 251"), input/output ("I/O") interface(s) 252, and/or communication and/or network interface(s) 253. The memory 251 may be any computer-readable medium, coupled to the processor(s) 250, such as random access memory ("RAM"), read-only memory ("ROM"), and/or a removable storage device. The memory 251 may store a wide variety of data files 254 and/or various program modules, such as an operating system ("OS") 255.

The data files 254 may include any suitable data that facilitates the operation of the server computing device 205 and/or interaction of the server computing device 205 with one or more other components of the networked computing environment 200. For example, the data files 254 may include information associated with facilitating imagery and point-cloud based facility modeling and remote change detection.

The OS 255 may be suitable module that facilitates the general operation of the server computing device 205, as well as the execution of other program modules. For example, the OS 255 may be, but is not limited to, Microsoft Windows®, Apple OSX™, UNIX, LINUX, a mainframe computer operating system (e.g., IBM z/OS, MVS, OS/390, etc.), or a specially designed operating system.

The network(s) 220 may include any telecommunication or computer network (e.g., an intranet, a wide area network, a local area network, a personal area network, the Internet, a cellular or mobile network, etc.) that may be utilized to facilitate communication between the server computing device 205 and the client computing device 210.

The one or more I/O interfaces 252 may facilitate communication between the server computing device 205 and one or more input/output devices; for example, one or more user interface devices, such as a display, a keypad, a touch screen display, a microphone, a speaker, etc., that facilitate user interaction with the server computing device 205. The one or more network and/or communication interfaces 253 may facilitate connection of the server computing device 205 to one or more suitable networks, for example, the network 220. In this regard, the server computing device 205 may receive and/or communicate information to other components of the networked computing environment 200 (such as the client computing device 210).

With continued reference to FIG. 2, any number of client computing devices 210 may be provided. In some embodiments, the client computing device 210 may include the data generation component 105, the reporting and administrative users component 160, and/or the field users/site managers component 170 described with respect to FIG. 1.

The client computing device 210 may further include, but is not limited to, an autonomous vehicle (such as a robot), sensor devices, a mobile device (e.g., a mobile phone, Personal Digital Assistants (PDAs), smartphone, tablet computing device, etc.), a desktop computing device, a laptop computing device, servers, multimedia players, embedded systems, wearable devices (e.g., smart watches, smart glasses, etc.), gaming consoles, combinations of one or more of the same, or any other suitable computing device. The client computing device 210 may utilize one or more processors 260 to execute computer-readable instructions that facilitate the general operation of the server computing device 205 and facilitating imagery and point-cloud based facility modeling and remote change detection.

In addition to having one or more processors 260, the client computing device 210 may further include and/or be associated with one or more memory devices 261 (hereinafter "memory 261"), input/output ("I/O") interface(s) 262, and/or communication and/or network interface(s) 263. The memory 261 may be any computer-readable medium, coupled to the processor(s) 260, such as random access memory ("RAM"), read-only memory ("ROM"), and/or a removable storage device. The memory 261 may store a wide variety of data files 264 and/or various program modules, such as an operating system ("OS") 266.

The data files 264 may include any suitable data that facilitates the operation of the client computing device 210 and/or interaction of the client computing device 210 with one or more other components of the networked computing environment 200. For example, the data files 264 may include information associated with facilitating imagery and point-cloud based facility modeling and remote change detection.

The OS 266 may be suitable module that facilitates the general operation of the client computing device 210 as well as the execution of other program modules. For example, the OS 266 may be, but is not limited to, a suitable mobile OS or a specially designed operating system. As desired, the client computing device 210 may additionally include one or more communication modules that facilitate interaction with other computing devices and/or other communications functionality. For example, a suitable near field communication module, radio frequency module, Bluetooth module, or other suitable communication module may be included in client computing device 210.

With continued reference to the client computing device 210, the one or more I/O interfaces 262 may facilitate communication between the client computing device 210 and one or more input/output devices; for example, one or more user interface devices, such as a display, a keypad, a mouse, a pointing device, a control panel, a touch screen display, a remote control, a microphone, a speaker, etc., that facilitate user interaction with the client computing device 210. The one or more network and/or communication interfaces 263 may facilitate connection of the client computing device 210 to one or more suitable networks and/or communication links. In this regard, the client computing device 210 may receive and/or communicate information to other components of the networked computing environment 200, such as the server computing device 205, and/or other devices and/or systems.

The networked computing environment 200 shown in and described with respect to FIG. 2 is provided by way of example only. Numerous other operating environments, system architectures, and device configurations are possible. Other system embodiments can include fewer or greater numbers of components and may incorporate some or all of the functionality described with respect to the system components shown in FIG. 2. Accordingly, embodiments of the disclosure should not be construed as being limited to any particular operating environment, system architecture, or device configuration.

Operational Overview

Figure 3:
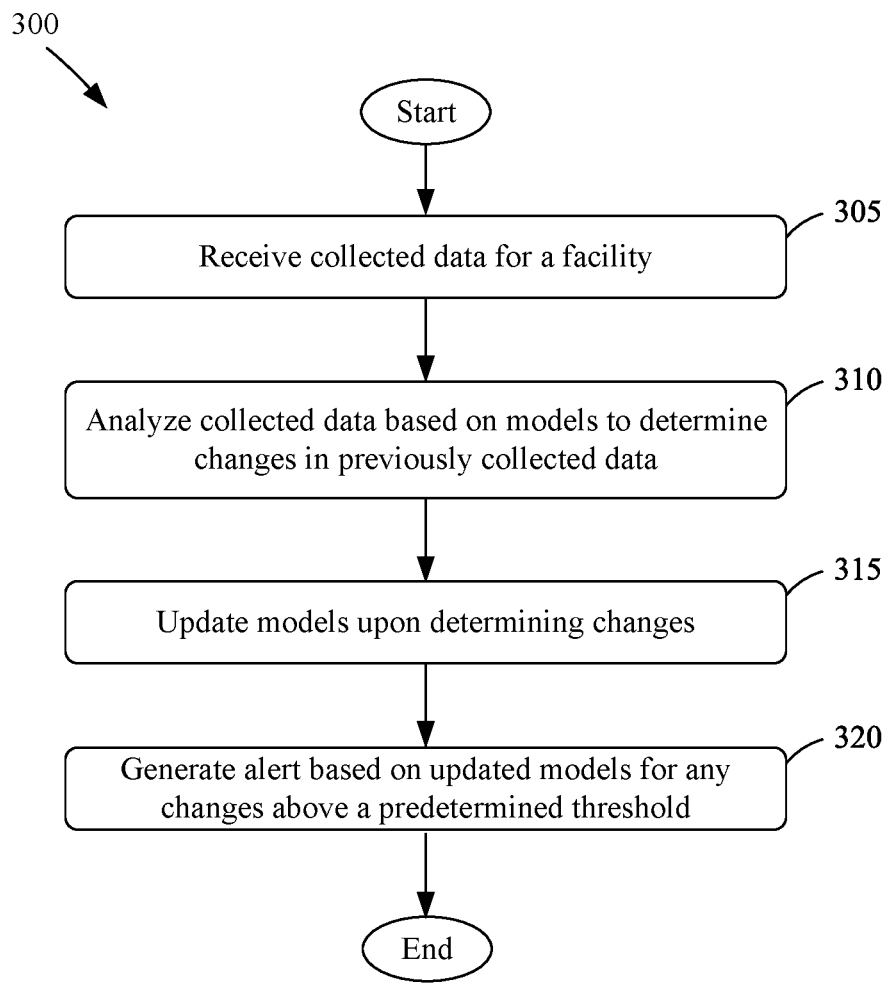
FIG. 3 illustrates a flow diagram of an example process for facilitating imagery and point-cloud based facility modeling and remote change detection, according to an example embodiment.

FIG. 3 illustrates a flow diagram of an example process 300 for facilitating imagery and point-cloud based facility modeling and remote change detection, according to an example embodiment. In certain embodiments, the operations of the example process 300 may be performed by one or more server and client computing devices, such as the data generation component 105, the high-availability cloud systems component 110, the reporting and administrative users component 160, and the field users/site managers component 170 illustrated in FIG. 1. The process 300 may begin at block 305.

At block 305, the data collection module 120 in the high-availability cloud systems component 110, may receive data collected by the data generation component 105 (i.e., the collected data 124) for a facility which may, in some examples, be a public utility substation. For example, the collected data 124 may include visible imagery data, point cloud data, thermal data, and/or multispectral data associated with a facility inspection. The received data may include an initial data collection or an updated data collection.

At block 310, the web gateway module 130 and the data processing module 140 in the high-availability cloud systems component 110 may analyze the collected data 124 based on the models 127 to determine changes in the previously collected data 129. The collected data 124 may be analyzed in a variety of ways.

In one example, the collected data 124 may be analyzed by comparing the first and second three-dimensional models (in the models 127) to new spatial image, multispectral, and thermal image data in the collected data 124. In some examples, the spatial image data may include image-derived point cloud data generated by ground and/or airborne LiDAR systems in the autonomous vehicles 108 in the data generation component 105. In other examples, the spatial image data may include image data generated by the fixed sensors 106 in the data generation component 105.

In some examples, the web gateway module 130 may facilitate the building of one or more initial models, based on the previously collected data 129, to describe a current state of equipment and features associated with a facility or substation. For example, the models 127 may be generated by (1) receiving spatial image data in the previously collected data 129, (2) generating, from the spatial image data, a first three-dimensional model identifying and coding each of the elements, and (3) assigning a first base-level buffer to each of the elements, the first base-level buffer representing a variability threshold with respect to dimensions and characteristics associated with each of the elements. For example, a typical variability threshold with respect to dimensions and characteristics associated with an element in a facility may include an equipment switch in an on or off position, an open or closed door, etc.

Additionally or alternatively, the models 127 may be generated by (1) receiving multispectral and thermal image data in the previously collected data 129, (2) generating, from the multispectral and thermal image data, a second three-dimensional model identifying and coding each of the elements, and (3) assigning a second base-level buffer to each of the elements, the second-base level buffer representing a variability threshold with respect to color, spectral reflectance, and temperature range for each of the elements. For example, a typical variability threshold with respect to color, spectral reflectance, and temperature range associated with an element in a facility may include sunlit/shaded, wet/dry, or changing illumination conditions.

In some examples, the elements associated with the physical structure of the facility may be fixed (e.g., a wall) and dynamic (e.g., a door or switch) objects or features within the facility and/or fixed (e.g., the ground and perimeter fencing) and dynamic (e.g., moveable outside structures) objects or features in a proximity to the facility.

At block 315, the web gateway module 130 may update the models 127 upon determining the changes in the previously collected data 129 at block 315. In some examples, the web gateway module 130 may facilitate the updating of an existing model 127 with change detection data and/or classification data determined by the data processing module 140.

At block 320, the web gateway module 130 may generate an alert, based on the updated models 127, to the field users/site managers component 170 indicating a current status of the facility or information for addressing an identified problem. The web gateway module 130 may generate the alert in a variety of ways.

In some examples, the alert may be generated by determining that a change in the previously collected data 129 exceeds the variability threshold represented by the first or second base-level buffers (i.e., the buffers 128 for at least one of the elements and then generating the alert to send to the field users/site managers component 170. For example, a facility transformer that is no longer operating (e.g., due to corrosion caused by excessive moisture or other causes) may represent a change exceeding a variability threshold (e.g., the transformer operating between a predictable range of current and voltage levels) and thus generate an alert to the field users/site managers component 170.

The process 300 may end following block 325.

Various embodiments of the invention are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. The computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments may provide for a computer program product, comprising a computer-readable medium having a computer-readable program code or program instructions embodied therein, said computer-readable program code adapted to be executed to implement one or more functions specified in the flow diagram block or blocks. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for facilitating imagery and point-cloud based facility modeling and remote change detection, the system comprising:
   at least one processor; and
   at least one memory storing computer-executable instructions that when executed by the at least one processor, cause the system to:
      receive, by a computing device, collected data for a facility;
      analyze, by the computing device, based on one or more models generated for previously collected data for the facility, the collected data to determine at least one change in the previously collected data, wherein the models are generated by:
         receiving spatial image data in the previously collected data, the spatial image data describing elements associated with a physical structure of the facility, wherein the spatial image data comprises image-derived point cloud data generated by one or more autonomous vehicles in proximity to the facility, the autonomous vehicles comprising at least one of a ground and airborne light imaging direction and ranging (LiDAR) system;
         generating, from the spatial image data, a first three-dimensional model identifying and coding each of the elements;
         assigning a first base-level buffer to each of the elements, the first base level buffer representing a variability threshold with respect to dimensions and characteristics associated with each of the elements, wherein the elements associated with the physical structure of the facility comprise at least a fence surrounding a perimeter of the facility and a transformer within the facility, wherein the facility comprises a public utility substation;

receiving multispectral and thermal image data in the previously collected data, the multispectral and thermal image data describing a color, spectral reflectance, and temperature range for each of the elements from one or more multispectral and thermal cameras;

generating, from the multispectral and thermal image data, a second three-dimensional model identifying and coding each of the elements; and assigning a second base-level buffer to each of the elements, the second-base level buffer representing a variability threshold with respect to the color, spectral reflectance, and temperature range for each of the elements, wherein the variability threshold with respect to the color, spectral reflectance, and temperature range for each of the elements comprises at least a presence of moisture associated with the transformer based on the spectral reflectance;

update, by the computing device, the models upon determining the at least one change in the previously collected data; and generate, by the computing device, an alert based on the updated models when the at least one change in the previously collected data is above a predetermined threshold corresponding to a current security or operational condition associated with the facility, wherein the alert is generated, at least in part, by determining that the at least one change in the previously collected data exceeds the variability threshold represented by the second base-level buffer for the transformer, wherein the variability threshold is exceeded when the transformer is no longer operating between an operational range of current and voltage levels due to the presence of the moisture.

2. The system of claim 1, wherein the elements associated with the physical structure of the facility comprise:
fixed and dynamic objects within the facility; and
fixed and dynamic objects in a proximity to the facility.

3. The system of claim 1, wherein the collected data is analyzed by:
comparing the first and second three-dimensional models to new spatial image, multispectral, and thermal image data in the collected data; and
determining a change in at least one of the elements based on the comparison.

4. The system of claim 1, wherein the spatial image data comprises image data generated by one or more fixed sensors associated with the facility.

5. A computer-implemented method for facilitating imagery and point-cloud based facility modeling and remote change detection, at least a portion of the method being performed by a computing device comprising at least one processor, the method comprising:
receiving, by the computing device, collected data for a facility;
analyzing, by the computing device, based on one or more models generated for previously collected data for the facility, the collected data to determine at least one change in the previously collected data, wherein the models are generated by:
receiving spatial image data in the previously collected data, the spatial image data describing elements associated with a physical structure of the facility, wherein the spatial image data comprises image-derived point cloud data generated by one or more autonomous vehicles in proximity to the facility, the autonomous vehicles comprising at least one of a ground and airborne light imaging direction and ranging (LiDAR) system;

generating, from the spatial image data, a first three-dimensional model identifying and coding each of the elements;

assigning a first base-level buffer to each of the elements, the first base-level buffer representing a variability threshold with respect to dimensions and characteristics associated with each of the elements, wherein the elements associated with the physical structure of the facility comprise at least a fence surrounding a perimeter of the facility and a transformer within the facility, wherein the facility comprises a public utility substation;

receiving multispectral and thermal image data in the previously collected data, the multispectral and thermal image data describing a color, spectral reflectance, and temperature range for each of the elements from one or more multispectral and thermal cameras;

generating, from the multispectral and thermal image data, a second three-dimensional model identifying and coding each of the elements; and assigning a second base-level buffer to each of the elements, the second-base level buffer representing a variability threshold with respect to the color, spectral reflectance, and temperature range for each of the elements, wherein the variability threshold with respect to the color, spectral reflectance, and temperature range for each of the elements comprises at least a presence of moisture associated with the transformer based on the spectral reflectance;

updating, by the computing device, the models upon determining the at least one change in the previously collected data; and generating, by the computing device, an alert based on the updated models when the at least one change in the previously collected data is above a predetermined threshold corresponding to a current security or operational condition associated with the facility, wherein the alert is generated, at least in part, by determining that the at least one change in the previously collected data exceeds the variability threshold represented by the second base-level buffer for the transformer, wherein the variability threshold is exceeded when the transformer is no longer operating between an operational range of current and voltage levels due to the presence of the moisture.

6. The computer-implemented method of claim 5, wherein the elements associated with the physical structure of the facility comprise:
fixed and dynamic objects within the facility; and
fixed and dynamic objects in proximity to the facility.

7. The computer-implemented method of claim 5, wherein analyzing the collected data comprises:
comparing the first and second three-dimensional models to new spatial image, multispectral, and thermal image data in the collected data; and
determining a change in at least one of the elements based on the comparison.

8. The computer-implemented method of claim 5, wherein the spatial image data comprises image data generated by one or more fixed sensors associated with the facility.

9. A non-transitory computer-readable medium comprising one or more computer-executable instructions that, when executed by at least one processor of a computing device, cause the computing device to:
- receive, by the computing device, collected data for a facility;
- analyze, by the computing device, based on one or more models generated for previously collected data for the facility, the collected data to determine at least one change in the previously collected data, wherein the models are generated by:
  - receiving spatial image data in the previously collected data, the spatial image data describing elements associated with a physical structure of the facility, wherein the spatial image data comprises image-derived point cloud data generated by one or more autonomous vehicles in proximity to the facility, the autonomous vehicles comprising at least one of a ground and airborne light imaging direction and ranging (LiDAR) system;
  - generating, from the spatial image data, a first three-dimensional model identifying and coding each of the elements;
  - assigning a first base-level buffer to each of the elements, the first base-level buffer representing a variability threshold with respect to dimensions and characteristics associated with each of the elements, wherein the elements associated with the physical structure of the facility comprise at least a fence surrounding a perimeter of the facility and a transformer within the facility, wherein the facility comprises a public utility substation;
  - receiving multispectral and thermal image data in the previously collected data, the multispectral and thermal image data describing a color, spectral reflectance, and temperature range for each of the elements from one or more multispectral and thermal cameras;
  - generating, from the multispectral and thermal image data, a second three-dimensional model identifying and coding each of the elements; and
  - assigning a second base-level buffer to each of the elements, the second-base level buffer representing a variability threshold with respect to the color, spectral reflectance, and temperature range for each of the elements, wherein the variability threshold with respect to the color, spectral reflectance, and temperature range for each of the elements comprises at least a presence of moisture associated with the transformer based on the spectral reflectance;
- update, by the computing device, the models upon determining the at least one change in the previously collected data; and
- generate, by the computing device, an alert based on the updated models when the at least one change in the previously collected data is above a predetermined threshold corresponding to a current security or operational condition associated with the facility, wherein the alert is generated, at least in part, by determining that the at least one change in the previously collected data exceeds the variability threshold represented by the second base-level buffer for the transformer, wherein the variability threshold is exceeded when the transformer is no longer operating between an operational range of current and voltage levels due to the presence of the moisture.

10. The non-transitory computer-readable medium of claim 9, wherein the elements associated with the physical structure of the facility comprise:
- fixed and dynamic objects within the facility; and
- fixed and dynamic objects in proximity to the facility.

11. The non-transitory computer-readable medium of claim 9, wherein the collected data is analyzed by:
- comparing the first and second three-dimensional models to new spatial image, multispectral, and thermal image data in the collected data; and
- determining a change in at least one of the elements based on the comparison.

12. The non-transitory computer-readable medium of claim 9, wherein the spatial image data comprises image data generated by one or more fixed sensors associated with the facility.

* * * * *